(12) United States Patent
Kontsov et al.

(10) Patent No.: US 11,080,089 B1
(45) Date of Patent: *Aug. 3, 2021

(54) SYSTEMS AND METHODS FOR MANAGING EXECUTION OF A SEQUENCE OF SOFTWARE APPLICATIONS

(71) Applicant: Parallels International GmbH, Schaffhausen (CH)

(72) Inventors: Sergey Kontsov, Moscow (RU); Nikolay Dobrovolskiy, Moscow (RU); Serguei M. Beloussov, Costa del Sol (SG)

(73) Assignee: Parallels International GmbH, Schaffhausen (CH)

( * ) Notice: Subject to any disclaimer, the term of this patent is extended or adjusted under 35 U.S.C. 154(b) by 6 days.

This patent is subject to a terminal disclaimer.

(21) Appl. No.: 16/704,353

(22) Filed: Dec. 5, 2019

Related U.S. Application Data (63) Continuation of application No. 15/900,856, filed on Feb. 21, 2018, now Pat. No. 10,534,637.

(51) Int. Cl.
| | |
|---|---|
| *G06F 9/48* | (2006.01) |
| *G06F 3/048* | (2013.01) |
| *G06F 9/54* | (2006.01) |
| *G06F 3/0481* | (2013.01) |
| *G06F 3/0486* | (2013.01) |

(52) U.S. Cl.
CPC .......... *G06F 9/4843* (2013.01); *G06F 3/0486* (2013.01); *G06F 3/04817* (2013.01); *G06F 9/54* (2013.01)

(58) Field of Classification Search
USPC ........................................................ 717/106
See application file for complete search history.

(56) References Cited

U.S. PATENT DOCUMENTS

| | | | |
|---|---|---|---|
| 10,534,637 B1 * | 1/2020 | Kontsov | G06F 9/4843 |
| 2008/0005752 A1 * | 1/2008 | Morris | G06F 9/45512 719/331 |
| 2011/0055408 A1 * | 3/2011 | Baker | H04L 67/327 709/228 |
| 2015/0007084 A1 * | 1/2015 | Bansal | G06F 8/35 715/771 |
| 2015/0317129 A1 * | 11/2015 | Falk | G06F 8/315 717/106 |
| 2018/0203674 A1 * | 7/2018 | Dayanandan | G06F 8/38 |

* cited by examiner

*Primary Examiner* — John Q Chavis
(74) *Attorney, Agent, or Firm* — Rosenberg, Klein & Lee (57) ABSTRACT

Disclosed are systems and methods for managing software applications. The system receives, via a graphical user interface, a request to generate a chain application with a sequence of execution comprising a first application and a second application. In response to determining that an output type of the first application is not compatible with an input type of the second application, the system updates, without further user input, the sequence of execution such that the second application precedes the first application. The system generates the chain application configured to execute the first application and the second application in the updated sequence of execution.

20 Claims, 6 Drawing Sheets

SYSTEMS AND METHODS FOR MANAGING EXECUTION OF A SEQUENCE OF SOFTWARE APPLICATIONS

CROSS-REFERENCE TO RELATED APPLICATIONS

This application claims benefit of priority to U.S. patent application Ser. No. 15/900,856 filed on Feb. 21, 2018, which is herein incorporated by reference in its entirety.

FIELD OF TECHNOLOGY

The present disclosure relates generally to the field of computer systems, more specifically, to systems and methods for managing software applications in a chained manner.

BACKGROUND

Application programs can perform a particular utility, task, function, or group of utilities, tasks, or functions for a user of the computer. Application programs may be bundled with an operating system, may be developed as commercial products by third parties, or may be open source. In some cases, an application program may be a part of an application suite, which contains several large applications bundled together as one product. While many multi-function application programs can perform a variety of different sets of utilities, tasks, or functions, often a user may want to perform a very specific desired functionality. Additionally, some application programs, because of their size and complexity, can be cost prohibitive for a user to purchase when they may only need to use a small number of the functions that the application programs provide. Moreover, while a user may know the desired functionality that they wish an application to perform, they may not be aware of any applications that are capable of performing that desired functionality.

Command line scripts and scripting languages (e.g., bash) can be used to execute multiple applications, but these technologies can be error prone during software development or during execution (e.g., code typos), and are costly to maintain. Additionally, a user is required to learn the scripting languages in order to write and maintain such command line scripts. Accordingly, there is a need in the art for a system and method that addresses the need for managing software applications.

SUMMARY

Thus, a system and method is disclosed herein for managing software applications, and, more particularly, for creating a chain of applications based on one or more application profiles associated with the applications.

In one aspect, a computer-implemented method for managing software applications is provided. The method includes receiving, via a graphical user interface, a user input request to chain together a first application and a second application, determining a first application profile associated with the first application, wherein the first application profile specifies a first input type and a first output type of the first application, and determining a second application profile associated with the second application. The second application profile specifies a second input type and a second output type of the second application. The method further includes, responsive to determining that the first output type of the first application is compatible with the second input type of the second application, generating a chain application configured to execute the first application and the second application in sequential order in which an intermediate output of the first application is passed to the second application as an input.

In another aspect, the user input request includes a drag-and-drop input event indicating a source icon representing the first application has been dropped on a destination icon representing the second application.

In another aspect, the method further includes displaying an icon representing the generated chain application associated with the first application and the second application. The icon includes a combination of visual elements of a first icon representing the first application and visual elements of the second icon representing the second application.

In another aspect, the method further includes receiving a subsequent user input request to chain together the chain application and a third application, determining a third application profile associated with the third application, wherein the third application profile specifies a third input type, and responsive to determining that the second output type of the second application is compatible with the third input type of the third application, generating a second chain application configured to execute the first application, the second application, and the third application in sequential order in which an intermediate output of the first application is passed to the second application as an input, and an intermediate output of the second application is passed to the third application as an input.

In another aspect, the user input request includes a drag-and-drop input event indicating a source icon representing a source application has been dropped on a destination icon representing a destination application. The method further includes selecting the destination application as preceding the source application in the sequential order based on a determination that an output type of the destination application is compatible with an input type of the source application and an output type of the source application is not compatible with an input type of the destination application.

In another aspect, the method further includes, responsive to determining that the first output type of the first application is not compatible with the second input type of the second application, refraining from generating the chain application.

In another aspect, the first and second applications are utility components of a toolbox application.

In another aspect, the method further includes receiving, via the graphical user interface, a user input selection of the first application and the second application, and in response to the user input request to chain together a first application and a second application, determining the sequential order based on the first application profile associated with the first application and the second application profile associated with the second application.

According to another exemplary aspect of the present disclosure, a system for managing software applications is provided. The system includes a storage device, and a hardware processor. The processor is configured to receive, via a graphical user interface, a user input request to chain together a first application and a second application, determine a first application profile associated with the first application, and determine a second application profile associated with the second application. The first application profile specifies a first input type and a first output type of the first application, and the second application profile specifies a second input type and a second output type of the second application. The processor is further configured to responsive to determining that the first output type of the first application is compatible with the second input type of the second application, generate a chain application configured to execute the first application and the second application in sequential order in which an intermediate output of the first application is passed to the second application as an input.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for managing software applications. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
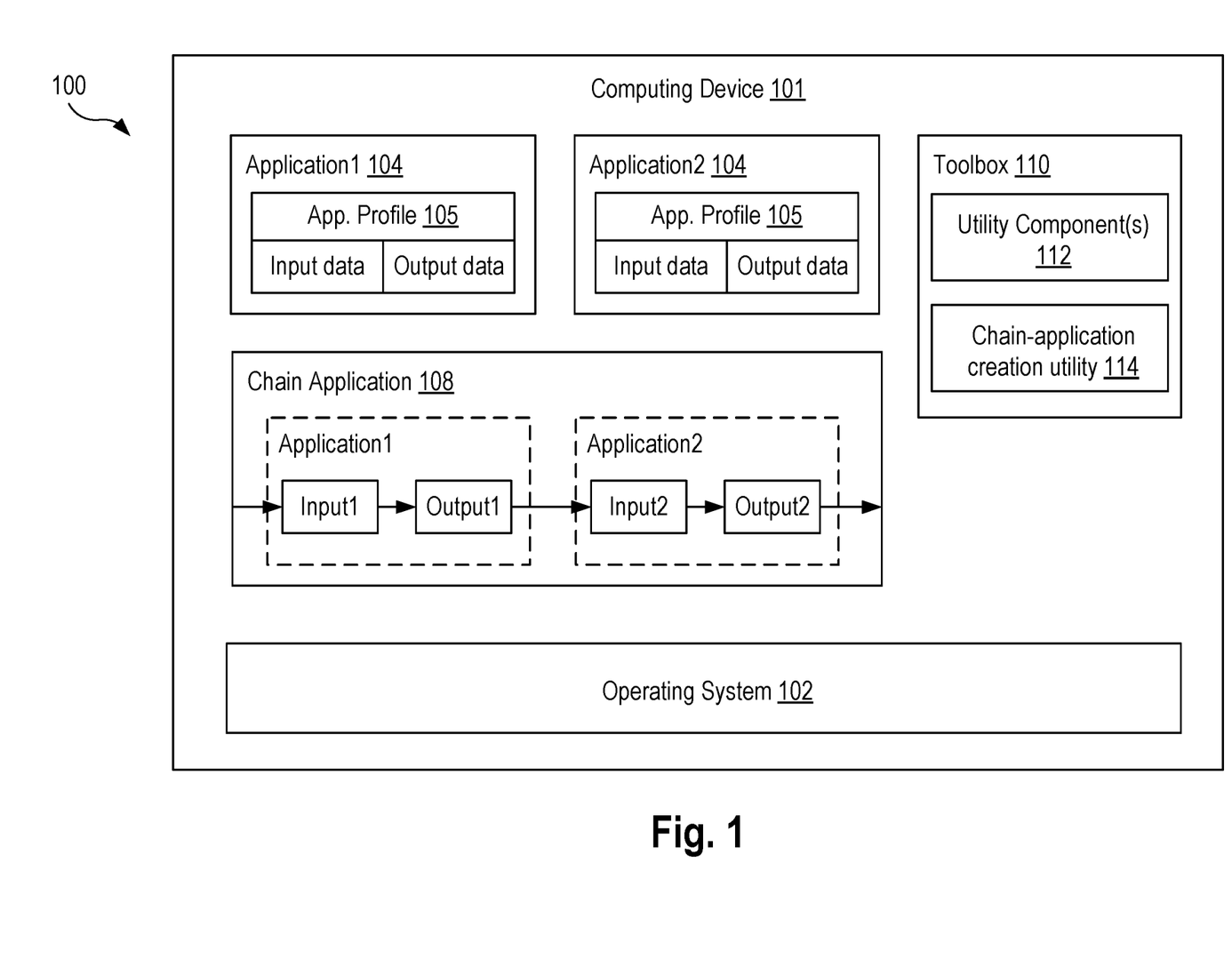
FIG. 1 is a block diagram illustrating a system for managing and creating chain applications according to an exemplary aspect.

FIG. 1 is a block diagram illustrating a system 100 for managing and creating chain applications according to an exemplary aspect. The system 100 includes a computing device 101 having an operating system 102 that supports execution of one or more applications 104. The computing device 101 may be any physical server, computer server, desktop, laptop, handheld device, tablet device, smartphone, or any other electronic device or hardware system suitable for implementing virtualization as described herein.

According to aspects of the present disclosure, the system 100 may be configured to provide an improved system for a user to organize a queue of tools (e.g., applications 104), each of which process or perform some action with a file and transfer the result (e.g., data, file, document) of the processing to another tool in the queue. The system 100 is configured to generate a chain application 108 that represents a chain of two or more applications 104 in a defined order. The chain application 108 is configured to, when executed, execute an application that is first in order, and pass its output to a next application in the order, and so forth for all applications within the chain. In one aspect, the chain application 108 is configured to, when executed, execute a first application (e.g., "Application1") and then a second application (e.g., "Application2") in sequential order in which an intermediate output of the first application is passed to and used by the second application as an input.

In one aspect, a chain application 108 represents a new application comprised of a chain of applications, and that has input data of the first application in the chain of applications, and output data of the last application in the chain of applications. In some aspects, the chain application 108 may be a script comprised of scripting code and that knows of input and output data of every application in the chain, knows how these application should be called, and decided where temporary or intermediate data should be stored, and so on.

To create chains of applications, an application 104 may include a special configuration file, referred to herein as an application profile 105, that provides information pertaining to the types of data can be passed into the respective application and the types of data that can be produced by the application. This profile 105 may define how input data is transferred into output data of the application. In one aspect, an application profile 105 associated with an application may specify an input type and an output type of that application.

In some aspects, the application profile 105 may be pre-determined, for example, provided with the application program files by the software developer or received from a third party repository of application profiles. In other aspects, the application profile 105 may be generated using information specified by user input, for example, by a chain-application creation and management utility 114 (described later). In one aspect, the application profile 105 may be stored locally with program data files of the application, for example, in the same application package as the executable code of the application. In another aspect, the application profile 105 may be stored in a central registry of the operating system 102 or in a database maintained by the chain-application utility.

In one implementation, the application profile 105 may be encoded in a text file having a structured or semi-structured format. Listing 1 below provides an example application profile formatted as a property list (plist) file. It is understood that other suitable formats may be used, such as a JSON (JavaScript Object Notation) file, configuration INI file, or XML, file.

Listing 1: Example Application Profile

```
<plist>
<dict>
    <key>ApplicationParameters</key>
    <array>
    <dict>
        <key>Input</key>
        <dict>
            <key>Type</key>
            <string>ImageFile</string>
            <key>Amount</key>
            <string>Any</string>
        </dict>
        <key>Output</key>
        <dict>
            <key>Type</key>
            <string>ImageFile</string>
            <key>Amount</key>
            <string>Any</string>
        </dict>
    </dict>
    <dict>
        <key>Input</key>
        <dict>
            <key>Amount</key>
            <string>1</string>
            <key>Type</key>
            <string>BinaryFile</string>
        </dict>
        <key>Output</key>
        <dict>
            <key>Amount</key>
            <string>1</string>
            <key>Type</key>
            <string>BinaryFile</string>
        </dict>
    </dict>
    </array>
</dict>
</plist>
```

As shown, the application profile 105 may specify a plurality of application parameters relating to the input and output of the application. Application parameters relating to the input may include a parameter specifying an input type (e.g., image file, binary file, any file), and optionally, a parameter specifying an amount of that input (e.g., a single file, multiple files). Similarly, the application parameters relating to the output may include a parameter specifying an output type, and optionally, a parameter specifying an amount of that output.

In one aspect, the application profile 105 may specify multiple parameters relating to the input to indicate that the application supports multiple input types. In some aspects, the application profile 105 may specify a particular input type results in a particular output type. For example, the example application profile in Listing 1 indicates the associated application accepts input of two types: an array of image files (i.e., "ImageFile" and amount is "any"), and a binary file (i.e., type is "BinaryFile" and amount is "1"). Further, the application profile indicates that the application will transform the input of the array of image files to an output that is an array of image files; and that the application will transform the input of the single binary file into one output binary file. In another example, an application profile for a file-archiver utility component may indicate that the utility component accepts a plurality of any type of files, and outputs a single archived file (i.e., compressing the one or more input files to use less storage space); and that the file-archiver utility component may also accept an input type of an archived file (e.g., RAR files, zip files, tar files) and outputs a plurality of any files (i.e., resulting from unarchiving or unzipping the archived file).

In one aspect, the system 100 is configured to generate a chain application 108 based on the application profiles of two or more target applications. The system 100 may be configured to first determine whether the two or more applications are compatible for chaining based on the application parameters as specified in the corresponding application profiles. In one aspect, two applications may be deemed compatible if an output type of a first application is compatible with or matches an input type of a second application (where "first" and "second" here refer to the ordering). If the output type does not match the required type for input in the second application, the system may refrain from constructing a chain from these two application. For example, consider a first application makes desktop screenshots and its output is one image file; and a second application is configured to convert any video file into a particular format supported by the computing device 101 ("Convert Video"). In this example, the system may refrain from connecting the desktop screenshot application with the convert-video application. In some aspects, the compatibility of two or more applications may be determined based on the type of data, as well as an amount of that data. That is, the output type of the first application matches the input type of the second application, and the amount of output of the first application also matches the amount of input of the second application.

In some aspects, the configuration value for the application profile may represent a range of values for data type and data amount, and a "match" with said range is achieved when another value satisfies the range. For example, an application profile specifying "one or more files" for an input is deemed a match with an application profile specifying "one file" for an output. In another example, an application profile specifying "any file" for an input is deemed a match for an application profile specifying "image file" for an output.

In one aspect, the applications 104 within the chain of applications may be one or more utility components 112 installed on the computing device 101. The system 100 may further include a toolbox 110 executing on the computing device 101 configured to manage the installation, configuration, and execution of one or more utility components 112 on the computing device 101. Utility components 112 may be software applications or modules that each serve a specific need of the user or provide a specific functionality to the user. Utility components 112 may include executable applications, workflow scripts that invoke other applications, reference links that can execute functions exposed by the operating system 102 of the computing device 101, reference links that can initiate execution of another utility component 112, or the like. In some implementations, a utility component 112 may be an application or component of the operating system 102 executing on the computing device 101 that can be invoked by the toolbox 110 to perform the desired functionality for the user. In one implementation, the toolbox 110 may be a software application installed on the computing device 101 and invoked by a user (e.g., from a dock, taskbar, or menu bar element). An example graphical user interface (GUI) of a toolbox 110 is described in conjunction with FIG. 2.

Figure 2:
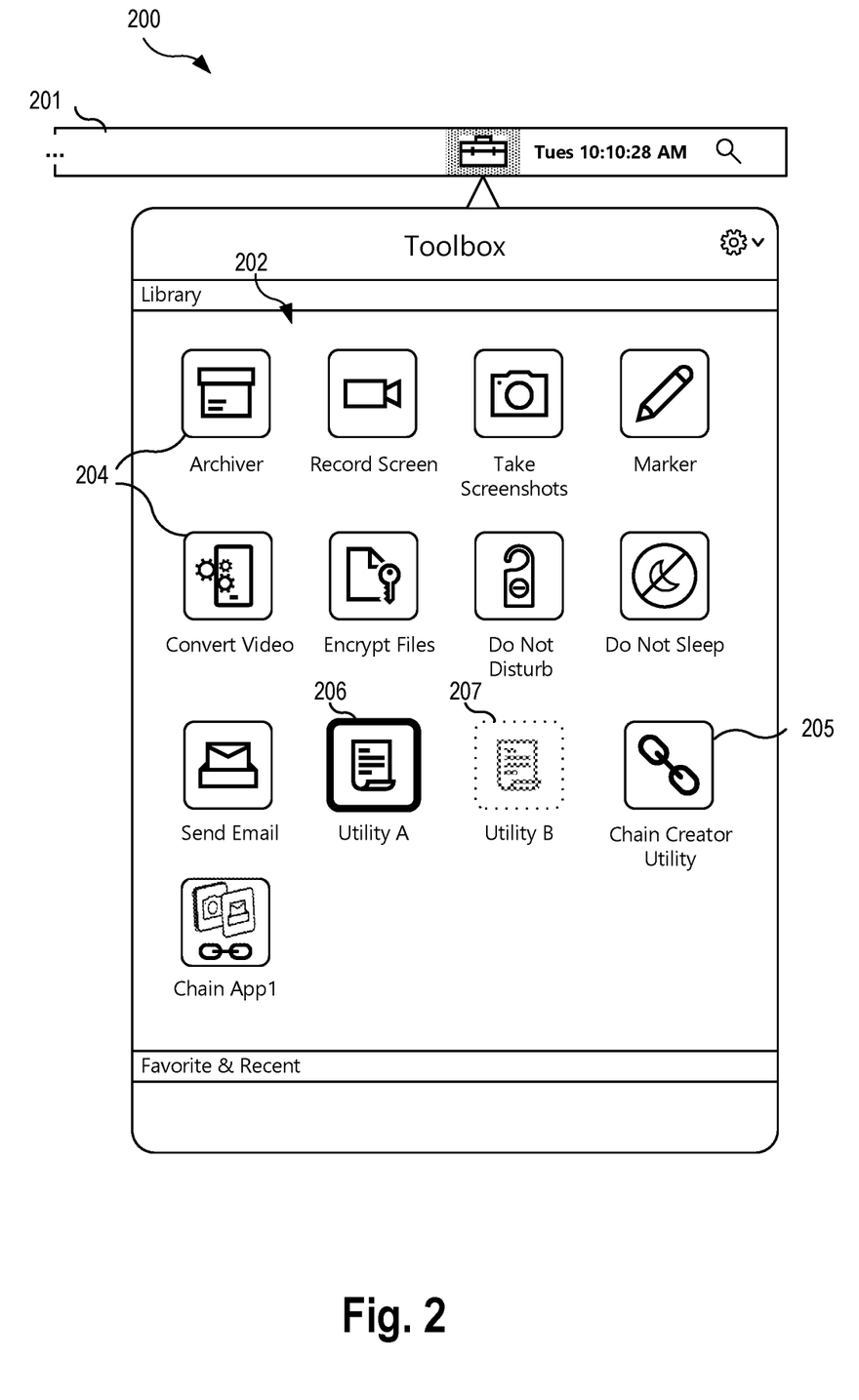
FIG. 2 illustrates an example graphical user interface of a toolbox for executing utility applications according to an exemplary aspect.

FIG. 2 illustrates an example graphical user interface (GUI) 200 of a toolbox for executing utility applications according to an exemplary aspect. In one aspect, the toolbox 110 may present the graphical user interface 200 on the computing device 101. In the example shown, the GUI 200 can be rendered as a popover- or panel-type user interface element launched relative to a toolbox icon in a menu bar 201 of the desktop environment of the computing device 101.

In one aspect, the GUI 200 includes a library section 202 having a plurality of user interface elements 204 (e.g., icons) corresponding to each of the utility components 112 made available by the toolbox 110. The utilities included within the library section 202 may include utility components 112 installed and available on the computing device 101. Each user interface element 204 may be configured to receive user input (e.g., mouse click) and, in response, initiate execution of the corresponding utility component 112 on the appropriate device (e.g., computing device 101 or server 106). For example, the desired functionality invoked by the toolbox 110 may include compressing a file or image ("Archiver"), encrypting a file ("Encrypt Files"), recording the display screen as a video ("Record Screen"), taking screenshots ("Take Screenshots"), marking documents ("Marker"), converting video for display on a device ("Convert Video"), enabling a do-not-disturb or do-not-sleep mode ("Do Not Disturb," "Do Not Sleep"), sending a file to a recipient via email, text message, etc., or any other type of functionality capable of being performed by a utility component executed by computing device 101.

According to aspects of the present disclosure, a number of approaches may be used as a user input via the graphical user interface to signify a request to chain together multiple applications. In a first approach, the user input may "pass" one application as input for a second one, for example, using a drag-and-drop operation (see FIGS. 3A and 3B). In a second approach, the user input may use a specialized chain-application creation utility 114 represented by an icon 205 in the library section 202 (see FIG. 4).

Figure 3A:
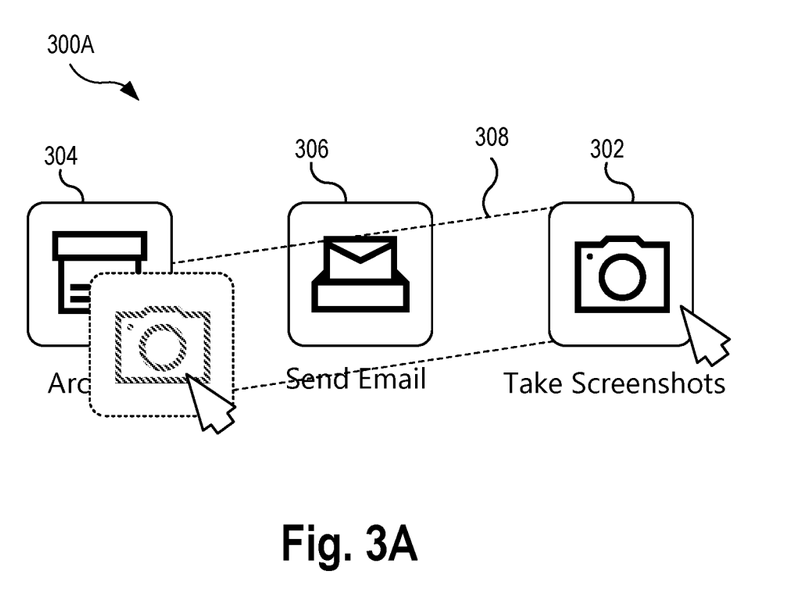
FIGS. 3A and 3B illustrate an example operation for generating a chain application using a graphical user interface according to an exemplary aspect.
Figure 3B:
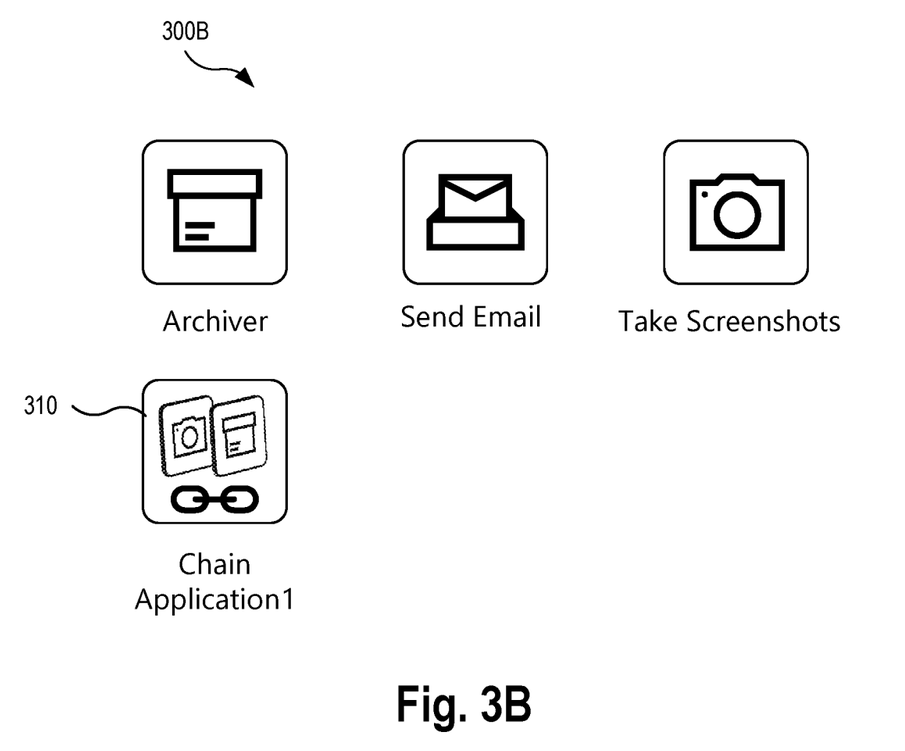

FIGS. 3A and 3B illustrate an example operation for generating a chain application using a graphical user interface according to an exemplary aspect. The graphical user interface depicted may a portion of, or similar to, the GUI 200 of FIG. 2. FIG. 3A depicts an initial state 300A of a graphical user interface having user interface elements 302, 304, 306 (i.e., icons) representing a plurality of utility components. The icon 302 represents a screenshot utility component ("Take Screenshots") configured to create a screenshot image of a display of the computing device 101 (i.e., output: image file). The icon 304 represents a file-archiver utility component ("Archiver") configured to package and compress one or more input files (i.e., input: any files; output: archive file). The icon 306 represents an e-mail utility component ("Send Email") configured to send one or more input files by e-mail to a particular person (i.e., input: any files; output: none).

The system 100 may be configured to pass one utility component as the input for a second utility component. In this case, the second utility component can parse the output of the first utility component as described in its application profile, and associate it with its own input, if possible. The result of such an operation is another application, i.e., a chain application. This approach is enabled when at least the second "destination" application is configured to be aware of and operate with application profiles.

In one aspect, the toolbox 110 may receive an input event for a drag-and-drop operation (depicted by dashed lines 308) indicating a "source" icon (302) representing the screenshot utility component has been dropped on a "destination" icon (304) representing the file-archiver utility component. This input event acts as a request to chain together the screenshot utility component and the file-archiver utility component, where the utility being dropped is the preceding application in the chain. In response to this request, the toolbox 110 retrieves the respective application profiles of the screenshot utility and the file-archiver utility. In this case, the toolbox 110 determines that the output type of the screenshot utility matches the input type of the file-archiver utility (i.e., "one image file" is compatible with "one or more any files").

As such, the toolbox 110 generates a chain application associated with a chain of the screenshot utility and the file-archiver utility configured to make a screenshot and archive it. In one aspect, the toolbox 110 may further create an application profile associated with the chain application, such that the chain application 108 itself may be used in additional chaining. The application profile for the chain application is created such that it contains the input types specified by the application profile for the application first in its chain, and the output types specified by the application profile for the application last in its chain.

The toolbox 110 may create a new GUI element representing the generated chain application, such as an icon 310, as shown in FIG. 3B depicting a subsequent state 300B of the graphical user interface. In some aspects, the created icon 310 may include a combination of visual elements from applications that comprise the chain of application. For example, the created icon 310 is rendered having the icon 302 and the icon 304 in a three-dimensional stack representing the order of the chain of applications (i.e., first, screenshot; second, file-archive). Other visual representations may be used.

To execute the chain application, the user may interact with and invoke the icon 310, as they would with the other utility components (e.g., clicking, dragging a file input onto it). When executed, the chain application is configured to execute the screenshot utility, then store the screenshot image file output by the screenshot utility in a temporary location, then execute the file-archiver utility using the screenshot image file as its input. The resulting archive file output may be stored in a location as configured by the file-archive utility.

In some aspects, the toolbox 110 may be configured to, during an ongoing drag user input, modify the rendering and display of one or more icons of utility components to indicate whether the corresponding utility component is compatible with the utility component being dragged. In response to an input event indicating a mouse-drag operation on a "source" icon 204, the toolbox 110 may retrieve application profiles for any present utility components and determine which ones are compatible with the utility component being dragged. In some aspects, the GUI 200 may render a portion of user interface elements 204 differently from other user interface elements based on whether it has been determined that the corresponding utility component is compatible for chaining or not. For example, as shown in FIG. 2, the user interface element 206 includes a strong-weighted outline compared to other icons to indicate that the Utility A is compatible to be chained with the source utility component based on an analysis of the corresponding application profiles. Other examples of graphical indications that a utility component is compatible with a source utility application for chaining includes a different background, highlighted color, or pattern. In another aspect, the user interface element 207 includes another graphical indication that de-emphasizes the Utility B (e.g., using a greyed-out graphical rendering or a dashed outline) to indicate that the Utility B is not compatible. In some aspects, the cursor itself might change (e.g., to an X or a circle-backslash symbol) to indicate that the Utility B is incompatible to be chained with the utility component being dragged.

In another example of a chain application, the user may drag the icon 302 to the icon 304 to create a chain application having a chain comprised of (1) the screenshot utility, and (2) the email utility. When executed, this chain application would create a screenshot of the computing device and send it in by email to one or more destinations.

In one aspect, the chain application itself may be used to form additional chains. For example, the user may drag-and-drop the icon 310 representing the chain application onto the icon 306 to generate a second chain application having a chain comprised of: (1) the screenshot utility, (2) the archiver utility, and (3) the email utility. When executed, this chain application would be create a screenshot, archive the screenshot, and then email the archived screenshot to one or more destination addresses. Similar to the example set forth above, the toolbox 110 determines whether the source chain application is compatible with the destination (third) application based on a comparison of the application profile associated with the chain application with the destination application. In an alternative aspect, rather than generate a new chain application, the system may modify the existing chain application by appending the destination application to the beginning or end of the chain. In some implementations, the system may determine whether to modify the existing chain or create a new chain based on a modifier key pressed by the user (e.g., a Control, Alt, or Option key).

In another aspect, the system may be configured to automatically match applications according to their required input when forming a chain of applications. That is, the system may be configured to re-order the sequence within the chain based on the associated application profiles, irrespective of which application was dragged and which was dropped. Consider an example in which there is a Utility A that captures still or animated GIFs from a video file (i.e., input: video file; output: image file), and a Utility B that downloads and re-encodes videos (i.e., input: video file; output: video file). If the user drags Utility A onto Utility B, the system will identify that the output of Utility B matches to the required input of Utility A, and create a chain application having a chain of (1) Utility B, then (2) Utility A, in sequence. Stated more formally: the user input request of a drag-and-drop input event indicates a source icon representing a source application (e.g., Utility A) has been dropped on a destination icon representing a destination application (e.g., Utility B). Based on a determination that an output type of the destination application is compatible with an input type of the source application, and the output type of the source application is not compatible with an input type of the destination application, the system selects the Utility B as the preceding application in the chain, rather than Utility A.

While described in detail in the context of utility components 112 managed by a toolbox 110, it is understood that the present technique and systems may be extended to the underlying operating system 102 itself for managing any application. Consider an example in which an icon for an Application B appears on an application launcher UI element of the operating system 102 (e.g., Dock in macOS®, the taskbar in Microsoft Windows®), such as in the case in which Application B is executing, or in the case in which Application B is pinned to the application launcher UI element of the OS. The user may drag an icon for an Application A from a separate window, such as a Finder view of the Applications directory. Rather than trigger an "open document" action by the Application B that is embedded in the operation system, this input action instead causes the creation of a chain application with the two applications (Application A and Application B). That is, the application itself is configured to read the application profile of the first application A and determine its compatibility. The first-in-order application in the chain will be the application that is being dropped. Its output will be passed to the input of the second application (e.g., the application in the taskbar), or vice versa. So the system may identify the required output and input of these applications and match accordingly to the chain. If the output and input are the same, the system can provide a user interface notification to the user about the successful creation of a chain application, for example, through a dialog box, or through the rendering of a new icon representing the chain application.

Figure 4:
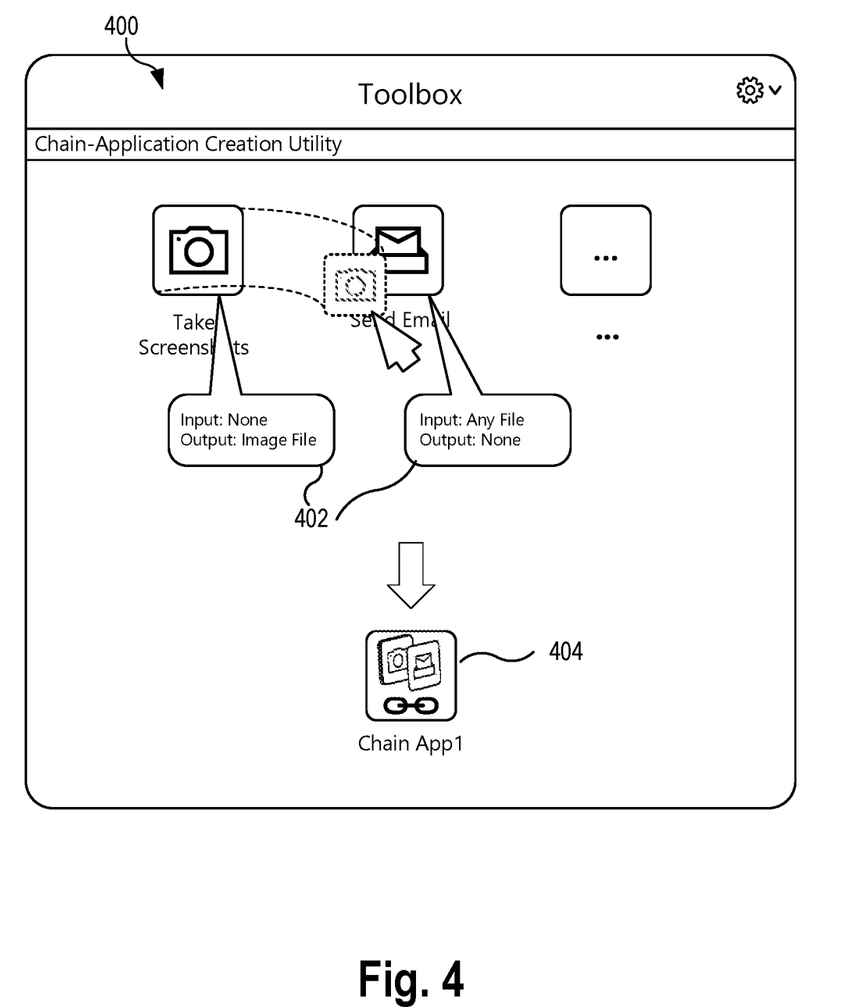
FIG. 4 illustrates an example graphical user interface of a chain application creator utility application according to an exemplary aspect.

FIG. 4 illustrates an example graphical user interface 400 of a chain-application creation utility 114 according to an exemplary aspect. In one aspect, the chain-application creation utility 114 may be configured to visualize the application profiles of the utility components. For example, the chain-application creation utility may display compatible input types and output types with a common color, shape, or other graphical rendering. In the aspect shown, the chain-application creation utility 114 may generate a graphical indication that displays text information representing the application profile, such as using pop-up balloons 402 or other contextual information elements. In one aspect, the chain-application creation utility 114 may be configured to provide the user with a user-friendly way to concatenate one application with another. In one aspect, each application may represented by a GUI element that may be selected, moved, re-positioned, and otherwise manipulated by user input (e.g., mouse cursor, touch input) to be connected to another utility component's GUI element to form a chain of applications. In one aspect, the chain-application creation utility 114 may be configured to create a resulting chain application (e.g., in response to a drag-and-drop, or in response to activation of a "Create Chain" button), and prepares the application profile for the chain-application utility itself. In the example shown, a new application icon 404 appears after dropping the "Take Screenshots" utility application onto the "Send Email" utility application.

In some aspects, the chain-application creation utility 114 may be configured to receive a selection of multiple applications (e.g., via cursor selection), and receive user input indicating a user intention to create a chain from all these selected applications (e.g., via a "Create Chain" button). In this case, the cursor click on an application results in not an invocation of the application itself, but a user selection for purposes of creating a chain application. In response to the "Create Chain" activation, the system may identify a "best" option for the order of the applications within the chain according to the input and output types of the selected application. In one aspect, the "best" option may be selected such that every selected application is linked within the chain in a compatible manner (e.g., no application goes un-used). If multiple "best" options for ordering the application are determined to be possible, the system may use any suitable tiebreaker method, including a random selection, an alphabetical order, etc.

In one aspect, the chain-application creation utility may be configured to test the chain of applications to verify the input and output results of the chain are as expected. Additionally, the chain-application creation utility 114 may be configured to create, via user input, application profiles for existing application that were not previously provided or configured for the chains of applications. In one implementation, the chain-application creation utility 114 may provide a GUI form element for specifying each of an input type and/or an output type for a given application.

Figure 5:
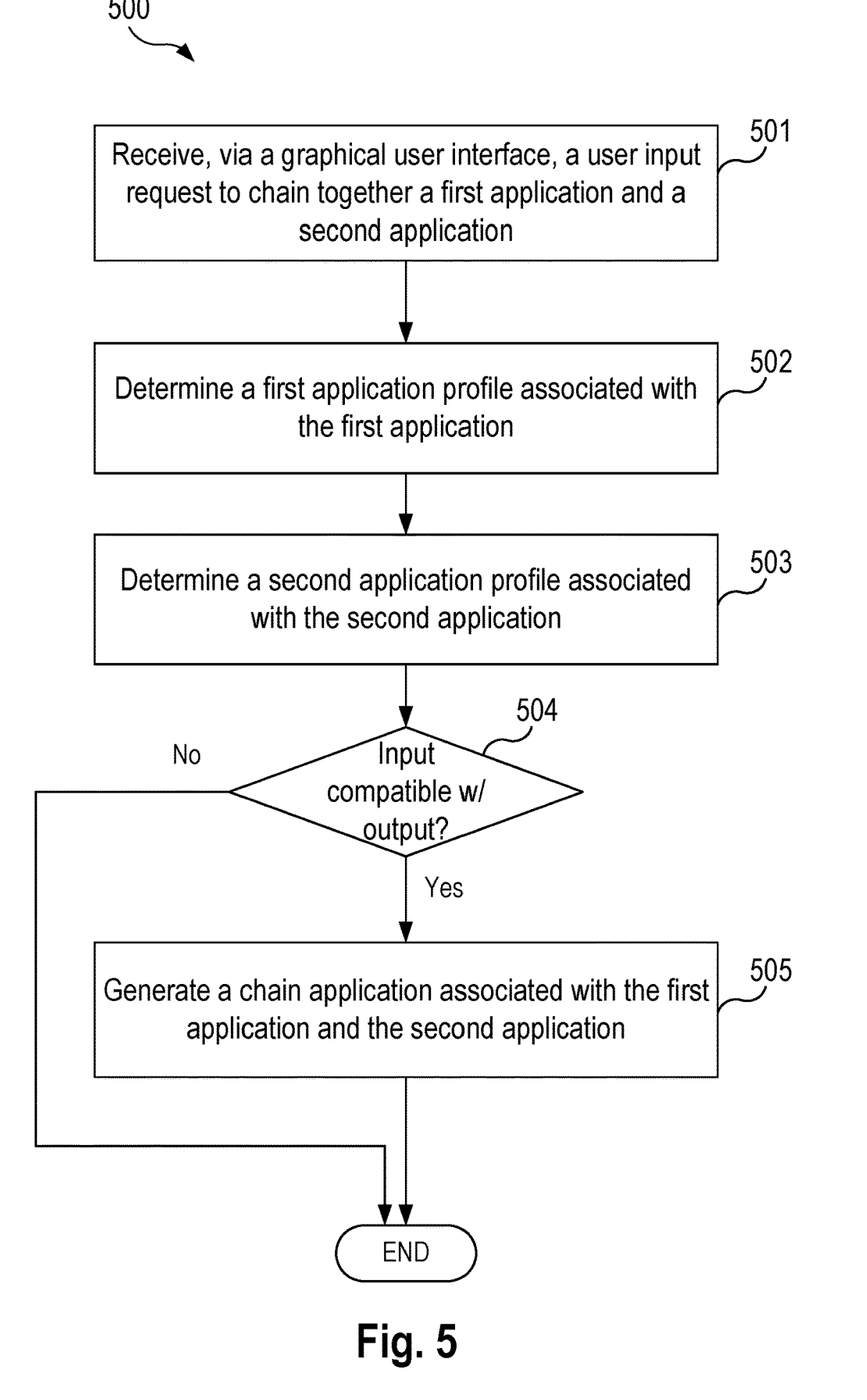
FIG. 5 is a flowchart illustrating a method for managing software applications according to an exemplary aspect.

FIG. 5 is a flowchart illustrating a method 500 for managing software applications according to an exemplary aspect. It is noted that the following description of the exemplary method makes reference to the system and components described above.

The method 500 begins at step 501, in which the system receive, via a graphical user interface, a user input request to chain together a first application and a second application. In some aspects, the user input request includes a drag-and-drop input event indicating a source icon representing the first application has been dropped on a destination icon representing the second application. In another aspect, the user input request is received by a chain-application creation utility 114 configured to display the application profiles associated with the first and second applications. In some aspects, the system may receive, via the graphical user interface, a user input selection of the first application and the second application.

In some aspects, the first and second applications are utility components 112 of a toolbox application 110. In one example, the first application may be configured to generate a screenshot of at least a portion of the graphical user interface, wherein the first application profile specifies the first output type is an image file. In another example, the second application is configured to archive one or more files, wherein the second application profiles specifies the first input type is a file.

At step 502, the system may determine a first application profile 105 associated with the first application, wherein the first application profile specifies a first input type and a first output type of the first application. At step 503, the system may determine a second application profile 105 associated with the second application, wherein the second application profile specifies a second input type and a second output type of the second application. In some aspects, the application profiles 105 may be retrieved from a central database or registry.

At step 504, the system may determine whether the first output type of the first application is compatible with the second input type of the second application. If so, at step 505, responsive to determining that the first output type of the first application is compatible with the second input type of the second application, the system generates a chain application configured to execute the first application and second application in sequential order in which an intermediate output of the first application is passed to the second application as an input. Otherwise, responsive to determining that the first output type of the first application is not compatible with the second input type of the second application, the system may refrain from generating the chain application. In some aspects, the sequential order of the chain application is determined based on the first application profile associated with the first application and the second application profile associated with the second application.

In some aspects, the system may display an icon representing the generated chain application associated with the first application and the second application. The icon may include a combination of visual elements of a first icon representing the first application and visual elements of the second icon representing the second application.

In some aspects, the system may receive a subsequent user input request to chain together the chain application and a third application, and determining a third application profile associated with the third application, wherein the third application profile specifies a third input type. The system may, responsive to determining that the second output type of the second application is compatible with the third input type of the third application, generate a second chain application. When executed, the second chain application is configured to execute the first application, the second application, and the third application in sequential order in which an intermediate output of the first application is passed to the second application as an input, and an intermediate output of the second application is passed to the third application as an input.

In some aspects, the user input request may include a drag-and-drop input event indicating a source icon representing a source application has been dropped on a destination icon representing a destination application. In this case, the system may select the destination application as preceding the source application in the sequential order based on a determination that an output type of the destination application is compatible with an input type of the source application and an output type of the source application is not compatible with an input type of the destination application.

Figure 6:
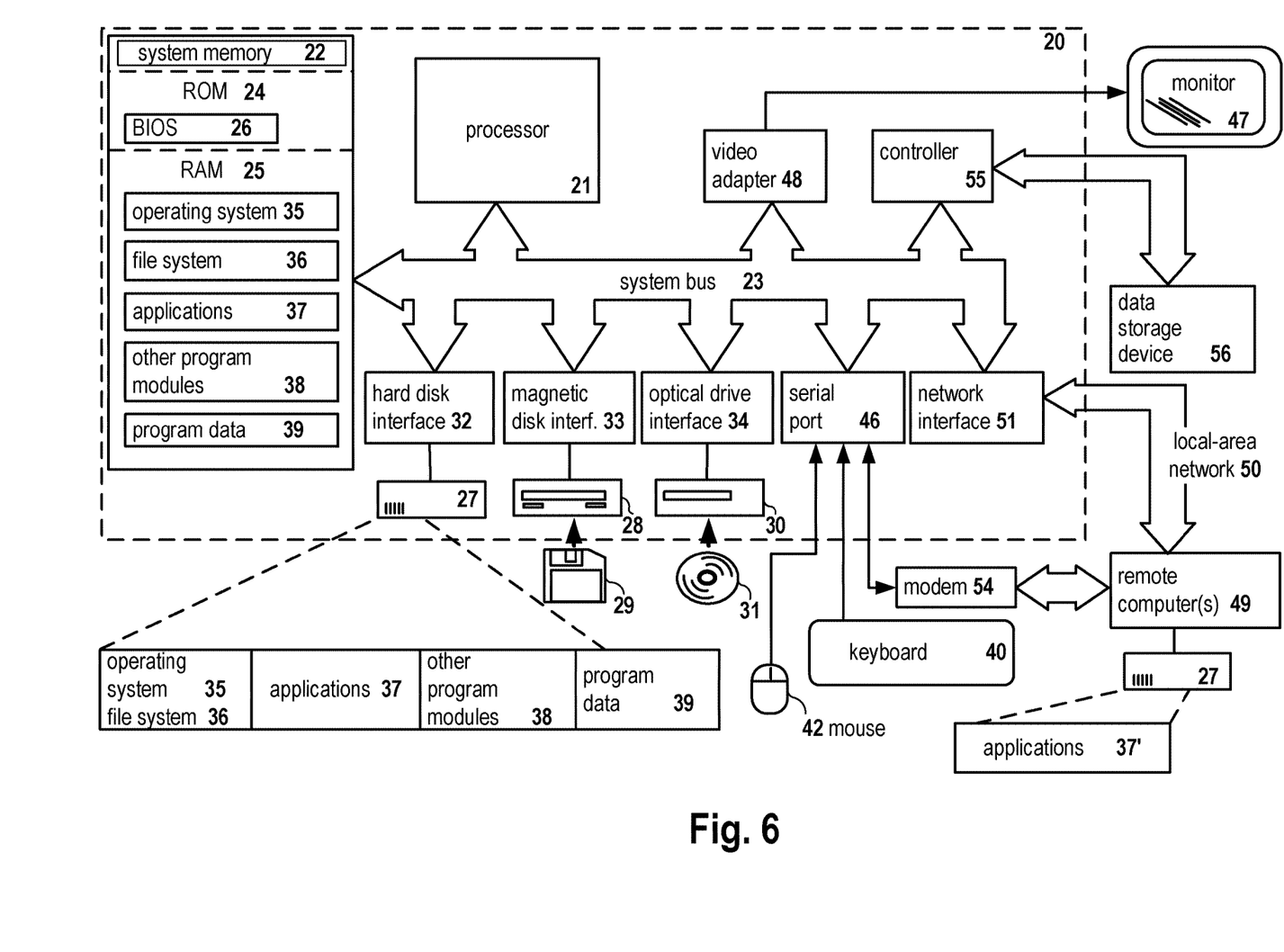
FIG. 6 is a block diagram of a general-purpose computer system on which the disclosed system and method can be implemented according to an exemplary aspect.

FIG. 6 is a block diagram illustrating a general-purpose computer system 20 on which aspects of systems and methods for managing software applications may be implemented in accordance with an exemplary aspect. It should be noted that the computer system 20 can correspond to the computing device 101, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for managing software applications, comprising:
    receiving, via a graphical user interface, a request to generate a chain application with a sequence of execution comprising a first application and a second application;
    in response to determining that an output type of the first application is not compatible with an input type of the second application, updating, without further user input, the sequence of execution such that the second application precedes the first application; and
    generating the chain application configured to execute the first application and the second application in the updated sequence of execution.

2. The method of claim 1, wherein an intermediate output of the second application is passed to the first application as an input according to the updated sequence of execution.

3. The method of claim 1, further comprising:
    identifying an input type and the output type of the first application; and
    identifying an input type and an output type of the second application.

4. The method of claim 1, wherein the sequence of execution comprises the first application followed by the second application.

5. The method of claim 1, wherein the request comprises a drag-and-drop input event indicating a source icon representing the first application has been dropped on a destination icon representing the second application.

6. The method of claim 1, further comprising:
displaying an icon representing the generated chain application associated with the first application and the second application, wherein the icon includes a combination of visual elements of a first icon representing the first application and visual elements of a second icon representing the second application, wherein the icon representing the generated chain application is rendered as the first icon and the second icon arranged in a three-dimensional stack representing the updated sequence of execution of the chain application.

7. The method of claim 1, further comprising:
receiving a subsequent request to chain together the chain application and a third application;
identifying an input type of the third application;
responsive to determining that the output type of the first application is compatible with the input type of the third application, generating a second chain application configured to execute the second application, the first application, and the third application in sequential order in which an intermediate output of the second application is passed to the first application as an input, and an intermediate output of the first application is passed to the third application as an input.

8. The method of claim 1, wherein an indication by the request of the sequence of execution is given by a selection of a source icon representing the first application followed by a subsequent selection of a destination icon representing the second application.

9. A system for managing software applications, the system comprising:
a storage device; and
a hardware processor configured to:
receive, via a graphical user interface, a request to generate a chain application with a sequence of execution comprising a first application and a second application;
in response to determining that an output type of the first application is not compatible with an input type of the second application, update, without further user input, the sequence of execution such that the second application precedes the first application; and
generate the chain application configured to execute the first application and the second application in the updated sequence of execution.

10. The system of claim 9, wherein an intermediate output of the second application is passed to the first application as an input according to the updated sequence of execution.

11. The system of claim 9, wherein the hardware processor is further configured to:
identify an input type and the output type of the first application; and
identify an input type and an output type of the second application.

12. The system of claim 9, wherein the sequence of execution comprises the first application followed by the second application.

13. The system of claim 9, wherein the request comprises a drag-and-drop input event indicating a source icon representing the first application has been dropped on a destination icon representing the second application.

14. The system of claim 9, wherein the hardware processor is further configured to:
display an icon representing the generated chain application associated with the first application and the second application, wherein the icon includes a combination of visual elements of a first icon representing the first application and visual elements of a second icon representing the second application, wherein the icon representing the generated chain application is rendered as the first icon and the second icon arranged in a three-dimensional stack representing the updated sequence of execution of the chain application.

15. The system of claim 9, wherein the hardware processor is further configured to:
receive a subsequent request to chain together the chain application and a third application;
identify an input type of the third application;
responsive to determining that the output type of the first application is compatible with the input type of the third application, generate a second chain application configured to execute the second application, the first application, and the third application in sequential order in which an intermediate output of the second application is passed to the first application as an input, and an intermediate output of the first application is passed to the third application as an input.

16. The system of claim 9, wherein an indication by the request of the sequence of execution is given by a selection of a source icon representing the first application followed by a subsequent selection of a destination icon representing the second application.

17. A non-transitory computer readable medium comprising computer executable instructions for managing software applications, including instructions for:
receiving, via a graphical user interface, a request to generate a chain application with a sequence of execution comprising a first application and a second application;
in response to determining that an output type of the first application is not compatible with an input type of the second application, updating, without further user input, the sequence of execution such that the second application precedes the first application; and
generating the chain application configured to execute the first application and the second application in the updated sequence of execution.

18. The non-transitory computer readable medium of claim 17, wherein an intermediate output of the second application is passed to the first application as an input according to the updated sequence of execution.

19. The non-transitory computer readable medium of claim 17, including instructions for:
identifying an input type and the output type of the first application; and
identifying an input type and an output type of the second application.

20. The non-transitory computer readable medium of claim 17, wherein the request comprises a drag-and-drop input event indicating a source icon representing the first application has been dropped on a destination icon representing the second application.

* * * * *